June 19, 1934.  F. G. LOGAN  1,963,093
ELECTRIC CONTROLLING APPARATUS
Filed Sept. 10, 1931
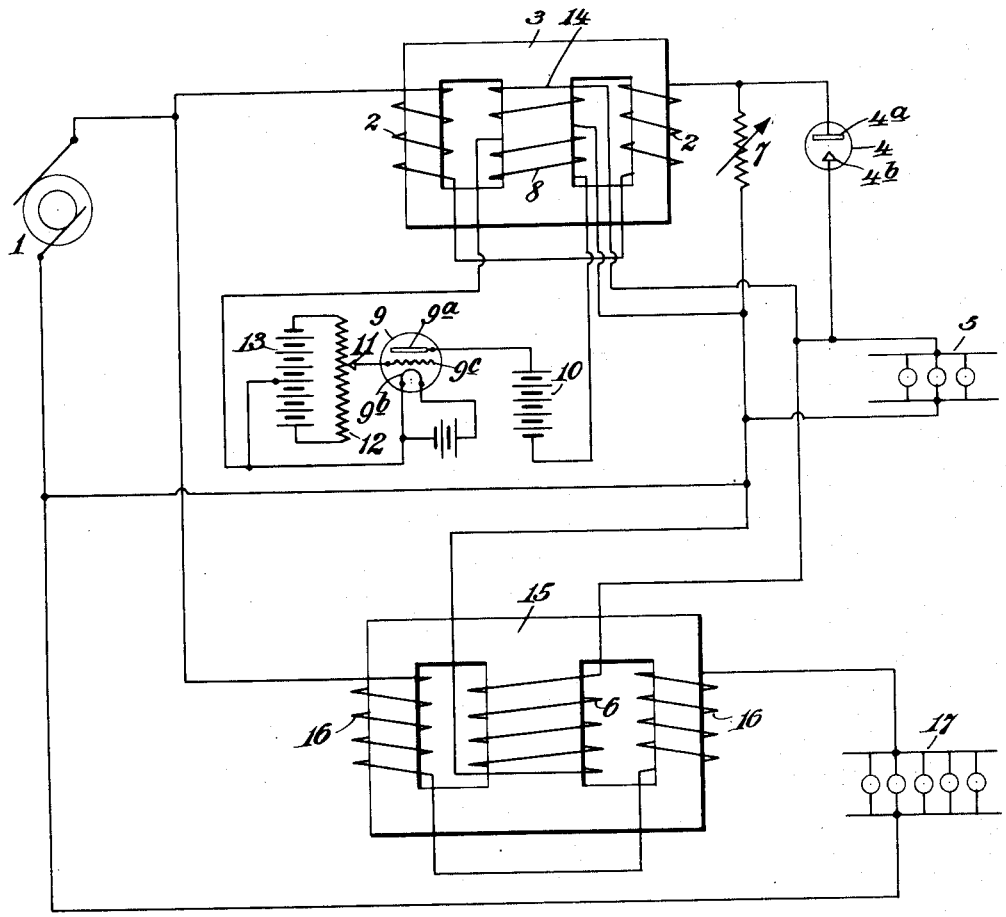
INVENTOR
Frank G. Logan
BY Lawrence K. Sager
his ATTORNEY Patented June 19, 1934

1,963,093

UNITED STATES PATENT OFFICE

1,963,093

ELECTRIC CONTROLLING APPARATUS

Frank G. Logan, Mount Vernon, N. Y., assignor to Ward Leonard Electric Company, a corporation of New York Application September 10, 1931, Serial No. 562,023

10 Claims. (Cl. 175—363)

This invention relates to the control of the current or voltage of a consumption circuit for any desired purpose and where the source of energy is alternating current. The invention is applicable to any desired purpose where it is desired to vary the voltage and current over a wide range. The load may be of any character and is especially applicable for use as a dimmer in controlling a lamp load from maximum brilliancy of the lamps to black-out. The load may be supplied with alternating current, or with direct current, and the load may be an intermediate controlling winding, for indirectly controlling a main load over wide variations of voltage and current in the latter.

An important object of the invention is to provide an improved method and improved form of controlling apparatus which will be capable of controlling the voltage and current in the consumption circuit over a wide range. Another object is to accomplish this by use of a comparatively small amount of controlling energy with reference to the energy controlled and by variations of the controlling energy within moderate limits. This permits the adjustable means for securing the controlling effects to be of small size and conveniently connected and located at any desired point remote from the main apparatus. Another object is to provide apparatus which will be of comparatively small size and permit installation in a limited amount of space. Another object is to avoid wasteful dissipation of heat energy, so that the apparatus will operate at comparatively high efficiency over the full range of control. Other objects are to provide apparatus of this character which will be of a simple character, reliable and durable with continued operation and require but slight attention during operation and permit convenient replacement and repair of parts. Other objects and advantages will be understood by those skilled in the art from the following description and accompanying drawing.

The figure is a diagram illustrating one embodiment of the invention, although various other forms of apparatus may be used and modifications made therein according to the conditions of any particular case. In practicing this invention, a source of alternating current and a rectifier are used, the output of the rectifier being controlled by use of a reactor in conjunction with the rectifier, and also by the provision of a bypass circuit for the purpose of controlling the output so as to be additionally effective in cooperation with the reactor as the voltage supplied to the consumption circuit is reduced. In the drawing, a source of alternating current energy 1 is indicated as supplying current through the windings 2 on the outside legs of a three-legged reactor having a core 3, the windings 2 being hereinafter called alternating current windings. The circuit continues from the windings 2 to a half-wave rectifier 4 having an anode 4a and a cathode 4b. The circuit then continues through a consumption circuit having a load 5 back to the source 1. The load 5 is indicated as a lamp load, but this may be a load of any other character, such as a controlling winding 6 of some other device, the winding 6 being shown in parallel with the load 5, and obviously the load may be any individual translating device, or composed of devices of different character. A non-inductive resistance or an impedance device 7 is connected in shunt across the rectifier and load on the rectifier circuit. This resistance may be a fixed resistance of comparatively high value, or it may be an adjustable resistance where desired, although for the usual cases where this invention is used, it need not be made adjustable. In some cases, it may be in the form of one or more incandescent lamps.

A direct current winding 8 is shown on the middle leg of the reactor and this is supplied with a variable voltage from any source of direct current, the variation of the direct current serving to control the reactance of the reactor and thereby control the voltage supplied to the rectifier. In the drawing, the variable source of direct current voltage is shown as derived from a three electrode vacuum tube 9 by variation of the grid potential. The plate 9a is connected through an energy supplying battery 10 to the winding 8 and the plate circuit then continues back to the filament 9b. The grid 9c is connected to an adjustable contact 11 which is adapted to move over a resistance 12 connected across a battery 13. Evidently the potential of the grid may be varied by adjustment of the contact 11 and thereby vary the current delivered to the direct current winding 8 of the reactor. An additional winding 14 is located on the middle leg of the reactor and is shown connected in parallel with the load on the rectifier circuit; but this winding could, if desired, be connected in series with the load in the rectifier circuit. This winding acts cumulatively with the winding 8 and permits the winding 8 to be provided with a less number of ampere turns and to draw less energy from the auxiliary direct current source. The winding 14 may be omitted when its cumulative effect is not required.

In operation, let it be first assumed that the maximum voltage and current is supplied to the winding 8. The reactor core 3 is then in a condition of nearest approach to saturation, and its reactance at a minimum. At this time the counter electro-motive force of the windings 2 is also at its minimum and the maximum voltage is supplied to the rectifier circuit and its load. At this time the winding 14 is carrying its maximum current by reason of receiving maximum voltage and current from the rectifier circuit, thus cooperating with the winding 8 with maximum effect. At this time, as far as the effect of the reactor is concerned, the voltage and current in the rectifier circuit are in phase, or nearly in phase. Current passes through the shunt resistance 7, but owing to its comparatively high resistance, the current and loss therein is comparatively small and its controlling effect at this time may be considered as not playing a part of any importance.

Now when the grid potential of the tube 9 is adjusted to reduce the current in the winding 8, the reactance of the core 3 is correspondingly permitted to increase together with the counter electro-motive force of the windings 2, which reduces the voltage and current of the rectifier circuit. The current passing through the winding 14 is obviously correspondingly reduced and thus its action is responsive to reduction of current in the winding 8 so as to cooperate therewith in reducing the direct current excitation of the core. As the reactance of the core 3 is increased by reduction of the direct current excitation, the resistance 7, even when not adjusted at all, takes more and more of an important part in reducing the output energy, and thereby cooperating with the reactor to still further reduce the voltage and current supplied to the consumption circuit so as to greatly increase the range of control over that which would be obtained by dependence upon the reactor alone.

In my pending application Serial Number 535,600, filed May 7, 1931, I have disclosed and claimed the method and means for controlling the energy for the purpose of varying the voltage and current of a consumption circuit, the present application being an improvement thereon and relating to the provision of auxiliary means for increasing the range of control and to attain other objects where the conditions require, or permit. In understanding the action of the resistance or impedance 7, let it be assumed that the direct current excitation of the windings 8 and 14 is at a minimum with resultant relatively low voltage and current in the consumption circuit. If the resistance, or impedance, 7 were absent from the circuit, there would be a current having a value dependent upon the reactance of the windings 2 and the impedance of the load circuit 6.

The presence of the resistance 7 and the shunt path provided thereby serves as a means to reduce the output energy, permitting the voltage and current of the consumption circuit to be reduced to any desired minimum. The function of the resistance 7 may be understood in a general way by appreciating the fact that when the windings 2 and the rectifier are non-active in delivering current to the consumption circuit, the alternating current from the source 1 flows in the opposite direction through the resistor 7 and windings 2. Thus the conditions set up in the windings 2 and core 3 as regards phase relation of current and voltage and flux tends to establish conditions which would exist if the reactor had not been subjected to an inactive condition as regards supply of energy to the consumption circuit. Consequently, when the rectifier again becomes active in delivering energy to the consumption circuit, the output energy is reduced or eliminated. It will be understood that during this condition of minimum adjustment, the voltage applied to the terminals of the resistor 7 is low and that the current flow therein which affects the output energy is correspondingly low. However, the current flow in the rectifier circuit during the half-wave of activity is likewise low, so that the necessary amount of current through the resistance 7 for affecting the output energy may be comparatively small. If desired, the resistance 7 may be reduced to have a small value at the time of minimum voltage and current in the consumption circuit, so that its effect upon the output energy will be more pronounced than when the resistance 7 remains fixed and thereby still further extend to a lower limit the voltage and current in the consumption circuit. In the usual case, however, a sufficient range of control may be obtained by permitting the resistance 7 to remain fixed.

In some cases, instead of controlling the load 5, the controlled current may be caused to control some means of another device, such as the direct current winding 6 of another reactor 15, having the winding 6 on its middle leg and the alternating current windings 16 on the outer legs in the case of use of a three-legged reactor. The windings 16 are connected in series in an alternating current circuit connected to the source 1, or any other alternating current source, and supply current to the load 17. Obviously, by control of the current in the winding 6 by means of the apparatus already described, the voltage and current supplied to the load 17 may be varied over wide limits; and a much greater amount of energy may be controlled by this method than can be controlled directly in the rectifier circuit when the latter is of limited capacity. Also, the load 17 may be an alternating current load as compared to the load 5, which is subjected to uni-directional current.

Although I have described one embodiment of my invention, it will be understood that the same is capable of various modifications and that various forms of apparatus may be used other than those particularly described, without departing from the scope of this invention.

I claim:

1. The combination of a reactor having an alternating current winding and a direct current winding, a rectifier supplied with energy derived from said alternating current winding and supplying current to a consumption circuit, means for varying current supplied to said direct current winding, and a shunt impedance path around a circuit containing said rectifier for passing current through said alternating current winding for affecting the flow of current through the rectifier when it becomes active in delivering current to the consumption circuit.

2. The combination of a reactor having an alternating current winding and a direct current winding, a rectifier supplied with energy derived from said alternating current winding and supplying current to a consumption circuit, means for varying the current supplied to said direct current winding, a shunt impedance path around a circuit containing said rectifier for passing current through said alternating current winding for affecting the flow of current through the rectifier when it becomes active in delivering current to the consumption circuit, and a second winding on said reactor acting cumulatively with said first-named direct current winding and supplied with current derived from said rectifier.

3. The combination of a reactor having an alternating current winding and a direct current winding, a rectifier supplied with energy derived from said alternating current winding and supplying current to a consumption circuit, means for varying the current supplied to said direct current winding, and an adjustable shunt impedance path around a circuit containing said rectifier for passing current through said alternating current winding for affecting the flow of current through the rectifier when it becomes active in delivering current to the consumption circuit.

4. The combination of a reactor having an alternating current winding and a direct current winding, a rectifier supplied with current derived from said alternating current winding and supplying energy to a consumption circuit, means comprising a three element tube for supplying energy to said direct current winding, means for varying the grid potential of said tube for varying the current delivered to said direct current winding, a shunt impedance path around a circuit containing said rectifier for passing current through said alternating current winding for affecting the flow of current through the rectifier when it becomes active in delivering current to the consumption circuit, and a second winding on said reactor acting cumulatively with said first-named direct current winding, said second winding being supplied with energy derived from said rectifier.

5. The combination of a reactor having an alternating current winding and a direct current winding, a rectifier supplied with current derived from said alternating current winding, means for supplying a variable current to said direct current winding, a shunt impedance path around a circuit containing said rectifier for passing current through said alternating current winding for affecting the flow of current through the rectifier when it becomes active in delivering current to the consumption circuit, a second reactor having an alternating current winding and a direct current winding, said last-named alternating current winding supplying energy to a consumption circuit, and connections whereby energy derived from said rectifier is supplied to said last-named direct current winding.

6. The combination of a reactor having an alternating current winding and a direct current winding, a rectifier supplied with energy derived from said alternating current winding in alternate periods of the supply current wave between alternate non-conducting periods of the supply current wave, said rectifier supplying energy to a consumption circuit, means for varying the current supplied to said direct current winding, and means for passing a current through said alternating current winding during its alternate non-conducting periods of the supply current wave for controlling the output of the rectifier and in a direction reverse to that of its supply current wave to the rectifier.

7. The combination of a reactor having an alternating current winding and a direct current winding, a rectifier supplied with energy derived from said alternating current winding in alternate periods of the supply current wave between alternate non-conducting periods of the supply current wave, said rectifier supplying energy to a consumption circuit, means for varying the current supply to said direct current winding and a shunt path around a circuit containing said rectifier for passing a current through said alternating current winding during its alternate non-conducting periods of the supply current wave for controlling the output of the rectifier and in a direction reverse to that of its supply current wave to the rectifier.

8. The combination of a reactor having an alternating current winding and a direct current winding, a rectifier supplied with energy derived from said alternating current winding in alternate periods of the supply current wave between alternate non-conducting periods of the supply current wave, said rectifier supplying energy to a consumption circuit, means for varying the current supplied to said direct current winding, means for passing a current through said alternating current winding during its alternate non-conducting periods of the supply current wave for controlling the output of the rectifier and in a direction reverse to that of its supply current wave to the rectifier, and a third winding on said reactor supplied with energy from said consumption circuit.

9. The combination of a reactor having an alternating current winding and a direct current winding, a rectifier supplied with energy derived from said alternating current winding in alternate periods of the supply current wave between alternate non-conducting periods of the supply current wave, said rectifier supplying energy to a consumption circuit, means for varying the current supplied to said direct current winding, means for passing a current through said alternating current winding during its alternate non-conducting periods of the supply current wave for controlling the output of the rectifier and in a direction reverse to that of its supply current wave to the rectifier, and a third winding on said reactor responsive to change of an electrical condition of said consumption circuit.

10. The combination of a reactor having an alternating current winding and a direct current winding, a rectifier supplied with energy derived from said alternating current winding in alternate periods of the supply current wave between alternate non-conducting periods of the supply current wave, said rectifier supplying energy to a consumption circuit, means for varying the current supplied to said direct current winding, means for passing a current through said alternating current winding during its alternate non-conducting periods of the supply current wave for controlling the output of the rectifier and in a direction reverse to that of its supply current wave to the rectifier, and a third winding on said reactor responsive to change of voltage of said consumption circuit.

FRANK G. LOGAN.